Dec. 5, 1967  J. W. HANNAH ET AL  3,355,819
TEACHING MACHINE

Filed Sept. 16, 1965  5 Sheets-Sheet 1

United States Patent Office 3,355,819
Patented Dec. 5, 1967

3,355,819
TEACHING MACHINE
Jack W. Hannah, Mansfield, and Harrold E. Hiatt, Galion, Ohio; said Hiatt assignor of four-tenths to Didactics Corporation, Richland, Ohio, a corporation of Ohio
Filed Sept. 16, 1965, Ser. No. 487,695
6 Claims. (Cl. 35—9)

ABSTRACT OF THE DISCLOSURE

This invention relates to an improved teaching machine wherein the description reflects the enhanced versatility of the machine by adding a system to automatically go into a condition where directions are taken from the film by the machine to override choices made by the student and to control presentations presented by this override mode in terms of the amount of time in which they are presented to the student. Thus, this teaching machine not only operates at the student's pace but goes into a condition whereby it paces the student.

---

This invention relates to a self-operated teaching machine, and more particularly to a machine which automatically selects lesson material and presents such material to an operator-student.

This invention is an improvement over that disclosed in application Ser. No. 155,931, now Patent No. 3,191,315, issued June 29, 1965.

A primary object of this invention is to provide a machine which selects a lesson or a series of lessons by means of a coded program which causes the machine to automatically operate in response to answers provided to the machine by the student-operator, these answers being in response to previously presented lessons or series of lessons.

In the modern educational system, it has become apparent that conventional teaching procedures are becoming more and more inadequate and various distinct disadvantages of these procedures are becoming more pronounced. For example, with the rise in population, classrooms have become more and more crowded and a close teacher-student relationship is difficult to maintain. This situation is particularly aggravated by the current shortage of qualified teachers. Furthermore, it has been recognized in the past several decades that it is highly desirable to scale the rate of advancement of material presented to a group of students to the ability of individuals within the group to absorb the material, or at least to the ability of smaller groups within a large class. Thus the concept of 1st, 2nd, 3rd, etc. grades is gradually being abandoned in the school systems in favor of more personalized attention to the learning needs of individual students, but at the same time, the problems inherent in such teaching theories have to a great extent thwarted the realization of a practical way of putting these teaching theories into practice.

While it is known to use visual teaching aids, these do not present a solution to the foregoing problems due to the necessity of utilizing them in group presentation. Their utility lies principally in permitting students to obtain a faster grasp of the point or object of a lesson which the teacher is presenting to the group.

In addition, several attempts have been made to develop machines which will aid in the teaching function by being automatic and self-operating, and will perform the function of the teacher along the lines of the teacher-student relationship. Many such machines, however, have met with very little success because of their complexity and expense and the difficulty experienced by the average student in mastering their operation. Several other well-known machines are objectionable since they can only be used once and are adaptable only to a very limited range of subjects. Moreover, many prior art machines are designed to employ only a single teaching method and cannot, therefore, be used for both instructing and testing.

Various other well-known teaching devices have been employed, using dials and indicators to present questions. The student will answer these questions by manipulating other dials and indicators. This type of teaching machine will then indicate when the answer to a particular question is correct by a suitable warning device. Machines of this type are undesirable since they require considerable manipulation on the part of the student. Moreover, these machines are more or less restricted as to the range of subject matter and the number of questions and answers that can be handled at one time. Considerable time and expense are required when a machine of this type is to be converted to include new subject matter.

The machine of this invention is intended to eliminate the foregoing disadvantages of prior art machines as well as other disadvantages now inherent in conventional classroom teaching procedures. Thus a specific purpose of this machine is to provide control over the presentation of information to the student in such a manner that will help the student understand, retain and be able to use the information. To this extent, the machine of the present invention is intended to be a substitute for a teacher at least to the limits of the capability of the machine.

In providing control over the presentation of information so that it can be readily learned by the student-operator, it is among the more specific objects of this invention to provide a teaching machine which achieves the following results:

To present more advanced information upon a student demonstrating an understanding of a lesson by selecting the correct answer from a choice of several answers.

To present corrective information and/or repeat the presentation of various portions of previously presented information upon a student demonstrating a lack of understanding of a lesson by selecting a wrong answer from a choice of several answers.

To present supplemental and/or corrective information, with or without testing at the completion of presentation of such information, by means of presenting this information on a series of frames which necessarily follow one another consecutively without regard to a student's opportunity for selectivity of response.

To present advanced information of a higher level, skipping over intermediate level information, upon a student demonstrating mastery of a group of lessons by selecting correct answers in all presentations without error.

To present supplemental information and/or repetition of presentations until mastery of the group of lessons is achieved by a student who demonstrates a lack of mastery of the group of lessons through occasionally selecting an incorrect answer to one of the presentations of the group.

To also present supplemental information and/or repetition of presentations upon a student demonstrating a lack of understanding of basic logical concepts underlying certain information by selecting answers at one point in the presentation of a group which are entirely inconsistent with some previous selection in the group.

To present the several lessons of a group selectively either at a pace determined by the student-operator or at a pace determined by a pre-set time limit after which the presentation is removed from observation by the machine.

Several features of the machine inherent in the last stated object are the provision of means for presenting information for a limited period of time and for permitting an unlimited period of time for response by the student to test his comprehension of the timed information presentation. Also, means for presenting information for a limited period of time and for also limiting the period of time for response by the student, with means to present an untimed corrective lesson upon the student failing to respond within the time limit or selecting an incorrect response. Still further are means for advancing from an untimed corrective lesson to the sequence of timed presentations, either with or without timing during the remainder of the sequence.

The principles of this invention are embodied in a teaching machine which functions as a teaching system and which operates basically upon a coded film strip upon which a programmer has reproduced and arranged written lesson material so that presentations of the material can be made which provide controls to the machine to achieve the several foregoing objects. Since, as stated above, probably no two students require exactly the same sequence of presentations during a study session, the machine provides the programmer or lesson writer the capability of having any response of the student serve to activate coding on the film strip to cause a selected presentation located at any point on the lesson film strip to be presented next.

More specifically, the lesson film strip is provided, in association with each lesson or presentation, with a separate coded array or program for each answer to which the student-operator can respond for a particular presentation. For example, a question in a presentation might have three answers, any one of which the student may select but only one being the correct answer. Each possible answer is provided with a coded array such that the selection of one answer causes the code on the film strip for that answer to be read into the machine and the film strip is then moved by the machine until a lesson presentation is found on the film strip which satisfies this coding. This lesson is then presented. Likewise, a selection of another answer causes another code to be read into the machine, resulting in a different presentation, perhaps from a far different location on the film, to be found and presented. The same applies to a selection of the third answer. Thus, the basic concept of operation of the machine of this invention is the provision of coding each lesson with an identity code and of providing each response possibility with coding which the machine is able to detect and use to find the identity code of the lesson which should be next presented.

In addition to this basic concept, this invention provides for the coding of the film strip frames in such a manner that the student-operator may not be given a choice of answers to respond to at the end of a frame, but rather may be instructed to actuate a specific control of the machine which has been predetermined to project a subsequent frame which is a continuation of the lesson material on the previous frame. The electrical controls of the machine are inoperative to respond to any answer push-button selected by the student other than that which he is instructed to actuate, so that a series of preselected frames may be programmed into the lesson series which do not depend upon student selection of controls for their consecutive presentation. By this and the foregoing means, the results of the first three of the previously stated objects are obtained.

In addition to the foregoing, the machine is provided with means for presenting advanced information of a higher level or supplemental and/or corrective information in response to mastery or lack of mastery of groups of lessons, or to detect and provide correction for a lack of logical understanding of groups of lessons, as set forth in the next three of the previously stated objects. This means is in the form of a memory-override device which consists of a set or cocking mechanism which places the device in a ready condition in response to the selection of a wrong answer from a group of possible answers, a triggering mechanism which turns on the device's output if it is in a ready condition and upon the machine sensing a triggering code from the film strip at the end of a group of lessons, and an uncocking or clearing mechanism which takes the device out of ready condition upon another group of lessons being presented. Whether this device is made ready, triggered, or cleared depends on whether or not a particular code exists at a lesson being viewed.

To illustrate the foregoing, when the cocking and triggering mechanisms are turned on, the output causes an identity code to be read off the film. The machine reads this code just as if it were a response of the student and proceeds to search the film strip until it finds the lesson with this identity code. This lesson is then presented to the student. Assuming that there are five individual lessons to be presented in sequence as a group of lessons, which embrace a whole concept, an incorrect response at any one of the lessons leads to a corrective presentation instead of the next more advanced information. However, after the corrective information has been presented, the next presentation is more advanced information. Each time an incorrect selection of answer is made in the original presentation and a corrective presentation is made in response to the selection of a wrong answer, the set or cocking mechanism or the memory-override device is actuated to place the device in a ready condition. At the end of the sequence of the original five presentations, there is a presentation with a triggering code on the film strip. If the memory-override device has been cocked because of the selection of a wrong answer followed by the presentation of a frame of corrective information, this triggering code will cause an identity code to be read out, and the machine then scans all lessons until the presentation is found which bears this identity code. This presentation is one which usually initiates a repetition of the same five frames of information; however, depending upon the particular code selected by the programmer in preparing the film strip, the presentation may be the start of a series of frames containing supplemental information.

Regardless of whether the next presentation after the triggering code beings a repetition of the original five frames of information or beings a series of supplemental lessons, the cocked or ready condition of the memory-override device is cleared by the presence of another code on the film strip which operates the uncocking or clearing mechanism of the device. If now the student moves through all five presentations without making an error in the selection of an answer and thereby does not receive corrective information on any frame where there is a code to actuate the memory-override device to a ready condition, then the trigger code at the end of the sequence will not activate the device and an identity code for a repetitive or supplemental lesson will not be read out. The machine is then in appropriate condition to present to the student-operator another group of lessons of more advanced information.

The machine of this invention is further provided with means for controlling the time during which selected lesson frames are presented to the operator-student in the several manners set forth in the last stated object above. As will become more apparent hereinafter, the previously mentioned memory-override device depends on the basic read-out and coded identity means on the film strip, and the means for timing the selected frames for presentation depends upon the memory-override device. Thus, a time, which delays the transfer of a signal, is placed on the output of the memory-override device, so that when the device is in a readied condition and a lesson is presented which contains a triggering code, the read-out of the code which causes the machine to immediately search for the next lesson is delayed. Thus the information on the triggering lesson will be presented for whatever period of time delay is set on the timer device. It is apparent that without the time the lessons are self-paced, that is, the rate of presentation of the several frames of information is under the control of the operator-student. When the timer is set to zero seconds of delay the memory-override device serves the function of giving monitored control over groups of information. But when the timer is set at some number of seconds of delay, the machine becomes capable of controlling the pace of the student by controlling the length of time of presentation of selected frames in accordance with which frames have been previously provided with a triggering code by the programmer.

A more thorough understanding of the present invention will be obtained from a consideration of the following detailed description thereof when considered in conjunction with the accompanying drawings, in which.

Figure 1:
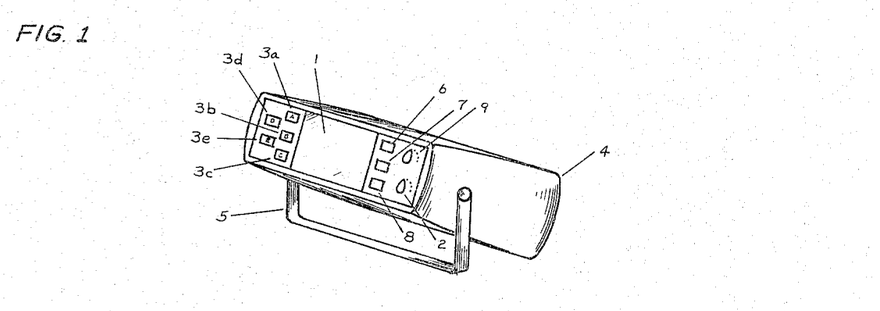
FIGURE 1 is a perspective view of the teaching machine of this invention.

Referring now to the drawings, and more particularly to FIGURE 1, there is illustrated a conveniently shaped housing 4 for the machine of this invention on the front of which is mounted a viewing or projection screen 1 on which is projected the lesson information by the apparatus hereinafter to be described. The housing also supports in conveniently accessible position a plurality of controls, which include a timer control knob 2, a plurality of answer selection push buttons, 3a, 3b, 3c, 3d, and 3e, a main power switch 6, a set button 7, a rewind button 8 and a start frame finder knob 9. These are the basic controls required by the operator-student for initiating the operation of the machine and for making his selected response to a particular lesson from which the machine will select the next lesson for presentation. The carrying handle 5 also serves to prop machine during operation.

Figure 2:
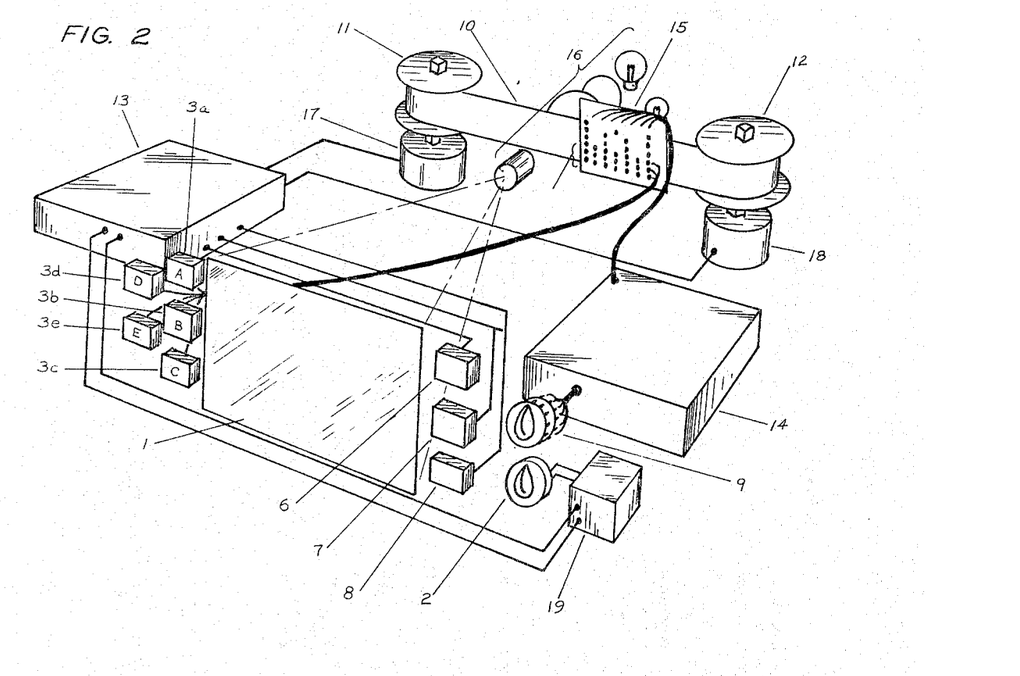
FIGURE 2 is a fragmentary exploded view of the machine of FIGURE 1 with the housing removed, illustrating the interrelationship of the basic components and controls.

FIGURE 2 illustrates the major operating components of the teaching machine, which are seen to comprise a film strip 10 which is wound on a supply reel, the latter being carried by the spindle of a drive motor 17 suitably mounted in the housing. Also mounted in the housing is an optical system 16 of conventional construction, comprising the usual system of projection lamp, condenser lens and projection lens.

Figure 3:
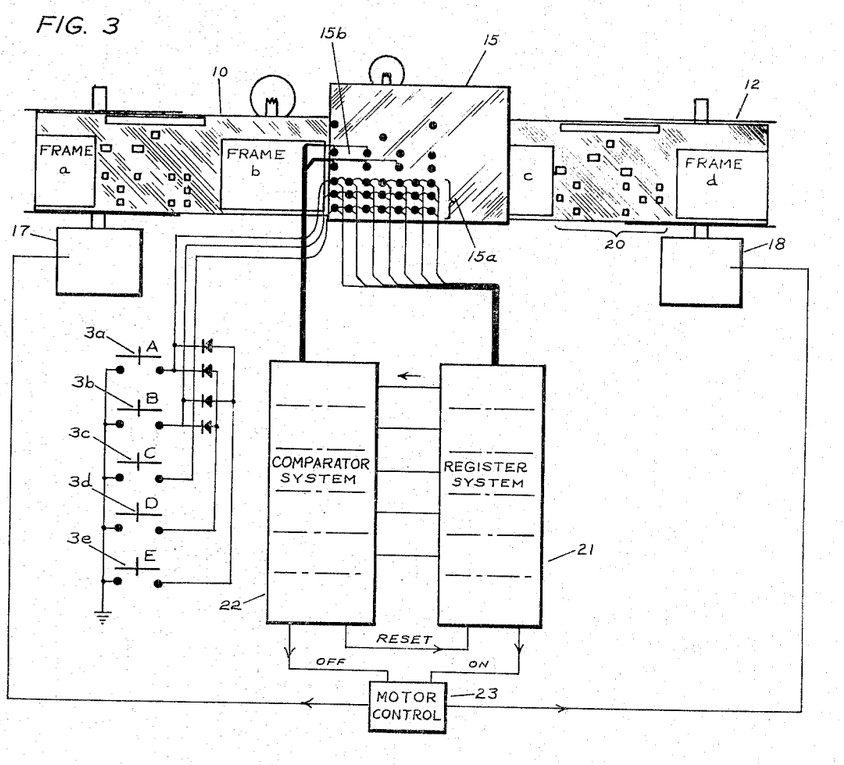
FIGURE 3 is a logic diagram of the means to read out codes from the film strip and find the next lesson which corresponds to the code that is read out.

Adjacent to the optical system 16 is a readout matrix 15 which may be of any suitable construction, such as one having photoelectric, direct electric contact or mechanical sensing means. While the readout matrix 15 is of known construction in the art and need not be described in detail, it nevertheless comprises a plurality of rows of sensing elements 15a (for example, photocells) which, as best seen in FIGURE 3, corresponds to the answer selection buttons 3a, 3b, 3c, 3d and 3e. There are also a plurality of other rows and individual sensing elements for purposes to be hereinafter made clear.

Referring to FIGURE 3, the film strip 10 is seen to comprise a series of frames, indicated as frame a, frame b, etc. These frames contain the information material which is projected onto the screen 1 and is the material which comprises a lesson to be learned by the operator-student. Between each pair of adjacent frames, and positioned to be in registry with the readout matrix 15 when a frame of information material is in registry with the optical system 16, is a coded portion 20 of the film strip. This coded portion contains a series of openings, conductor strips or opaque reflective surfaces, depending upon the nature of the sensing elements of the readout matrix 15. The coding on the film strip causes the sensing elements of the matrix 15 to emit appropriate signals controlled in accordance with the particular program of the coding 20 to actuate the machine in a desired manner according to the student-operator's response to a lesson, in a manner to be fully described hereinbelow.

The readout matrix is responsive to emit a signal only when there is a code present on the film strip in one of the rows 15a, and then only when one of the push buttons is actuated to make a selection. Therefore, if a particular frame, or a selected series of frames, has been provided with a code for only one of the rows of sensing elements 15a, the matrix will emit a signal only when the push button 3a, 3b, or 3c is actuated which corresponds to the row of sensing elements of 15a for which a code has been provided. Or, in the case of 3d and 3e the combined coding of two rows (for 3d that corresponding to the 3a and 3b and for 3e that corresponding to 3a and 3c) is sensed. By this means the programmer of the film strip is free to predetermine various series of frames through which the student-operator must progress in accordance with the free selectivity of response the student exercises at any given frame.

The machine further includes a register-comparator component, generally indicated by the numeral 14 in FIGURE 2. In FIGURE 3, the register-comparator is diagrammatically illustrated wherein the register 21 is an array of settable elements responsive to signals from the readout matrix 15 which register the receipt of such signal. These elements may be relays of flip-flop type logic elements, and there is one for each possible coded position capable of being read off by the sensing elements 15a of the readout matrix 15.

Also, as seen in FIGURE 3, the comparator 22 contains a corresponding set of settable units responsive to signals from both the register 21 and from additional sensing elements 15b in the readout matrix 15. These comparator units are of the type having the capability of comparing a signal received from the register elements with a signal received from the readout matrix elements 15b and of emitting a signal when a comparison is found to effect a change in the operation of the machine. Again, the comparator units may be relay, transistorized, or other type of exclusive-or logic circuits.

The register 21 and the comparator 22 are interconnected with a suitable motor control device 23 which is responsive to a signal from the register 21 to effect operation of one or the other of the driving motors 18 or 17 to drive the film strip 10 in a forward or reverse direction respectively, depending upon the type of signal received from the readout matrix 15, which in turn depends upon the selection of push button 3a, 3b, 3c, 3d, or 3e and the program of the code for the rows of sensing elements 15a corresponding to these push buttons. As indicated above, the necessity for the selectivity of direction of film travel lies in the flexibility of program arrangement permitted the programmer by the machine of this invention, in that it may be desirable to arrange supplemental or corrective information on the film strip in locations either in advance of or following a series of informational frames making up a group of lessons. The nature of this aspect of operation is explained in more detail hereinbelow.

The comparator 22 is also interconnected with the motor control 23, the latter being responsive to a signal from the comparator when a compared circuit is found by the readout matrix 15 while scanning the film strip during movement of the latter in response to a signal from the register 21. When an appropriately coded lesson frame is found by the sensing elements 15b of the readout matrix 15, and the comparator determines that this code matches the code registered from the previous frame in the register, the comparator emits a signal to the motor control component 23 which is effective to cause the motor control to stop the operation of the drive motor and register the newly found frame of information with the optical system for projection onto the screen 1. The specific construction of the motor control is not critical to the present invention and therefore need not be further described in detail, several arrangements of this device being apparent to those skilled in the art.

There has been thus far described a machine having the capability of achieving the functions set forth in the first three of the previously stated objects, that is, the advancement of the film strip automatically to the next advanced lesson upon the selection of a correct answer to a previous lesson, or the presentation of a frame of supplemental and/or corrective information in response to the selection of an incorrect answer, as well as the presentation of a series of predetermined frames of supplemental and/or corrective information in response to actuation only of a preselected one of the push buttons 3a, 3b, 3c, 3d, or 3e as determined by only a single code on a frame. The procedures will be described in more detail hereinafter.

Figure 5:
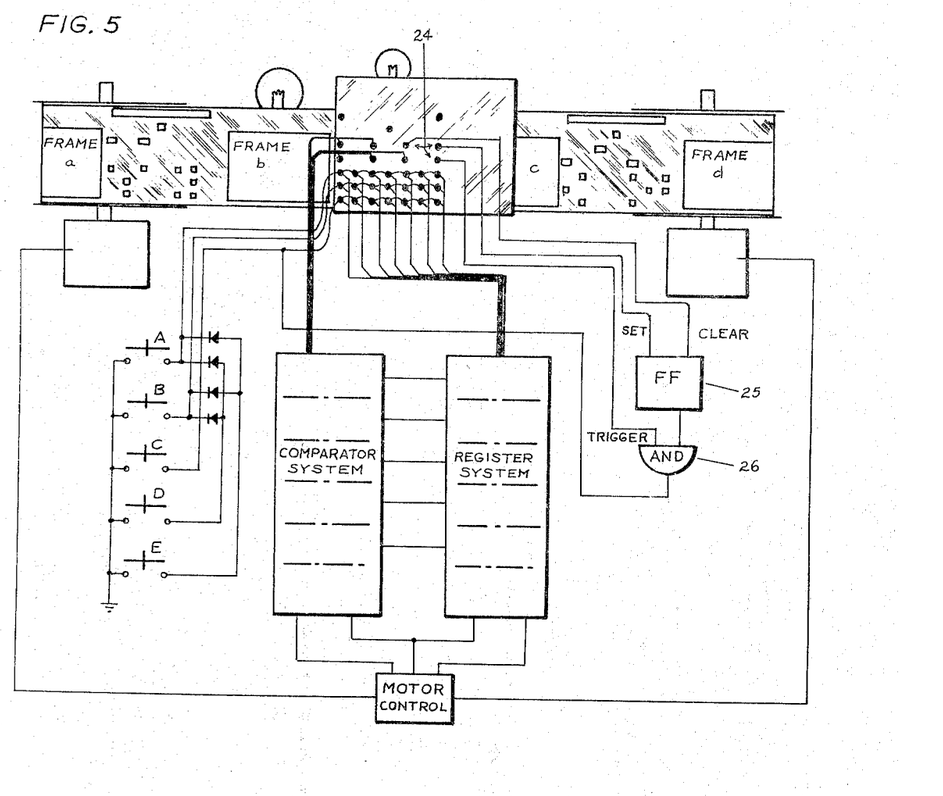
FIGURE 5 is a logic diagram of the means to ready trigger, clear and automatically read out the code from the film strip which determines the next lesson.

Referring now to FIGURE 5, there is illustrated the addition to the above described basic construction of FIGURE 3 the means to detect correct or incorrect responses to a series of lessons, and to detect completely illogical responses to a series of lessons and present the necessary corrective information, all as set forth in the next three of the previously stated objects. This is the aforementioned memory-override device which consists of a flip-flop storage circuit 25 having inputs connected to the appropriate sensing elements 24 of the readout matrix 15, and an AND gate 26 the input of which is also connected to one of the sensing elements 24 of the readout matrix. One of the two inputs to the flip-flop storage circuit 25 is connected to the sensing element 24 which senses the film strip to detect a setting or cocking code element of the code section 20 of the film strip. The other input to the flip-flop storage circuit 25 is connected to the sensing element 24 which senses the film strip to detect a clearing code element of the code section 20 of the film strip. The input to the AND gate 26 is connected to the sensing element 24 which senses the film strip to detect a triggering code element of the code section 20 of the film strip.

The construction and arrangement of these parts is such that a code on the film strip at a certain location in the coded portion 20 is capable, by means of a signal from one of the sensing elements 24 of the readout matrix 15, of setting or cocking the flip-flop 25 which in turn sends a signal to the AND gate 26, even after the input to the flip-flop 25 has been removed. This is what is termed as "readying" or "cocking" the memory-override device. As the presentation of lessons progresses, and the film strip moves from frame to frame, another code on the coded portion 20 of the film strip is capable, by means of a signal from another of the sensing devices 24 of the readout matrix 15, of triggering the AND gate 26 to cause the latter to emit a signal. Still another code on the film strip at a certain location in the coded portion 20 is capable, by means of a signal from another one of the sensing elements 24 of the readout matrix 15, of clearing or resetting the flip-flop 25 so that its output to the AND gate 26 is removed. Any one of the cocking, triggering or clearing signals is present only while its associated frame is in the projectable position. However, a cocking signal is "remembered" by the flip-flop 25 and produces a continuous signal from the flip-flop to the AND gate unless removed by a clearing signal.

The output of the AND gate 26 is connected to the readout matrix 15, and is used as a type of response signal sent to activate the matrix just as happens when the latter is activated by one of the push buttons 3a, 3b, 3c, 3d, or 3e. Thus the output signal from the AND gate 26 is effective to cause the film to be moved to any other frame whose identity code has been programmed into the appropriate row of sensing elements 15a. In the specific embodiment of the invention illustrated, the AND gate 26 is connected to the same row of sensing elements that is activated by the push button 3c; however, any row could serve or a special row could be set aside for codes which are to be activated by the AND gate output. It should be noted that an output of the AND gate 26 is obtained only when there is an output from the flip-flop 25 and a trigger signal present on the particular frame being projected on the screen 1. The presence of either the trigger signal or the flip-flop signal alone will not cause the AND gate to generate an output.

Figure 7:
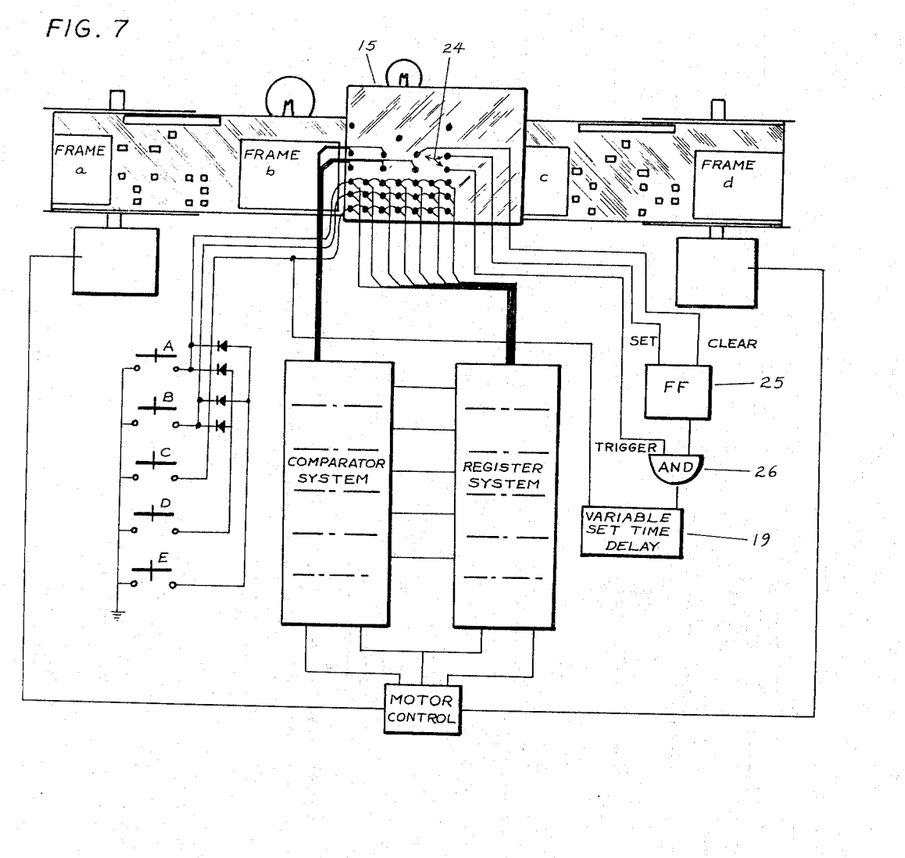
FIGURE 7 is a logic diagram of the means to time the presentation of a selected lesson frame on the film strip.

Referring now to FIGURE 7, there is illustrated the means by which the structures of FIGURES 3 and 5 are further modified to enable an entirely different type of function to be performed, which function is the last of the previously stated objects. In this embodiment, there is a time delay circuit 19, which is capable of being set for various periods of delay, in series with the output of the AND gate 26. The time delay circuit may be set for any period of delay by means of the control knob 2 (FIGURE 1) which usually is in the range of zero to sixty seconds. This delay is set by the student or operator, and will remain unless subsequently changed; in other words, the time delay circuit does not need resetting after each use. The time delay circuit is so connected into the system that it may either be set for zero time delay or be removed from the system, in either of which events there is no time delay and the AND gate 26 functions as with the embodiment illustrated in FIGURE 5. With the time delay, however, it is apparent that any frame on the film strip which has a triggering code element in the code portion 20 which is sensed by one of the corresponding sensing elements 24 of the readout matrix 15 will remain projected on the viewing screen for the period of time which has been set on the time delay circuit 19, instead of such frame being immediately removed from observation and a new frame presented. This is because the output signal from the AND gate will not activate the readout matrix 15 until the delay period is completed.

Through the use of the time delay circuit 19, it is possible to time the period of presentation of any frame of information for a desired amount, except for the first frame presented which must cock or set the flip-flop 25. This is determined by which of the frames of information have been previously provided with a triggering code by the programmer of the film strip. Once the flip-flop 25 is placed in readied condition by the presence and sensing of a cocking code, any subsequent frame which has a triggering code thereon will remain in view for the period of time set on the time delay circuit, whether it is a next consecutive frame or a subsequent frame that follows intermediate frames having no triggering code thereon. This series of events continues until a frame is reached which contains a clearing code, whereupon the time delay circuit 19 becomes inoperative until another frame is reached which contains a cocking code. By this means there is great flexibility of arrangement of time or untimed presentation of various frames, and timing may be included in a series of lessons making up a group depending upon whether the information presented is in the regular course of advancing order or is corrective or supplemental information.

Figure 4:
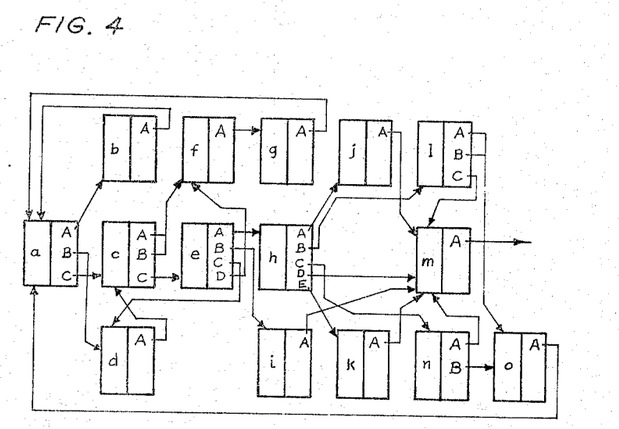
FIGURE 4 is a map which typically shows how a series of lessons in a program may be directed and controlled by the means in FIGURE 3.

From the foregoing description, an explanation of a typical operational procedure of the machine will now be readily understood. Referring first to FIGURE 4, which provides an indication of the results of the basic process, each box indicates a frame, the boxes being indicated by the small letters a, b, c, etc. Each frame bears information to be learned by the student-operator as well as a question with a multiple of answers, in this case five, the answers being indicated by the capital letters A, B, C, D and E. These answers are selected by the push buttons 3a, 3b, 3c, 3d and 3e. The information on a frame instructs the student to press one of the buttons to advance the film strip to the next frame if the lesson is not complete on the frame being projected, or to make a choice and press one of the push buttons 3a, 3b, 3c, 3d or 3e to answer a question. This choice and what happens is indicated for each frame in FIGURE 4 by the capital A, B, C, D or E. For example at frame a, if push button 3a is pressed to select answer A, which is the wrong answer to the question on frame a, the code read into the register will correspond to the identity code of frame b. Consequently, as the film moves, a match is made when frame b reaches the projectable position, and the b frame information, which may be corrective or supplemental, is then presented to the student. When he has completed studying the corrective information, assuming there is no time limit involved, he has no choice but to press the push button corresponding to A, whereupon the code that is read into the register directs the motor control to cause the film to traverse in the reverse direction and also stores the identity of frame a. When frame a reaches the projectable position, a match of its identity code in the comparator with that stored in the register is obtained and the comparator signals the motor control to stop the movement of the film, permitting frame a to be presented on the screen.

On the other hand, if, in response to the question on frame a, incorrect answer B is selected, a similar procedure to that described above is followed by the machine, except that the corrective information next presented is on frame d, and after this information has been presented, the student is directly to press the push button corresponding to A, and the film is moved to frame c, which is the next advanced lesson in the group. It is apparent that the programmer has previously decided that once the corrective information on frame d has been presented to the student-operator, it is not necessary to return to frame a for a representation of that frame.

If the student selects the correct answer C in the first instance in response to the question on frame a, he is immediately advanced to the information on frame c without the intermediate corrective or supplemental information on frame d being presented.

After studying the information on frame c, if the student selects the correct answer C, he is advanced to frame e, the next consecutive lesson in the series of lessons. However, if he selects either of the incorrect answers A or B, he is advanced to the frame f of supplemental or corrective information. It will be noted that frame f has only one code identity on it which corresponds to the position on the readout matrix 15 to actuation of the push button for selection of what would be an answer A. The student is instructed to select and actuate the push button for A, the readout matrix being inoperative to initiate a signal if the student does not comply with the instructions.

Similarly, the next consecutive frame g also has only one predetermined code identity thereon which returns the student to frame a for a complete review of the series of lessons. In this manner, by restricting the code identities on a selected one or any number of corrective or supplemental information frames, the programmer may compel the student to observe a series of such frames in sequence without regard to any question of selectivity on the part of the student-operator.

It is apparent from FIGURE 4, that the frames a, c, e, h and m are a series of five consecutive lessons in a group of lessons, and that only the selection of the correct answers on these frames, for example C, C, A and D will permit the student to reach frame m without any intermediate frames of corrective or supplemental information being presented. Of course, it is quite possible that one of these frames may be corrective information and that one of the frames b, d, f, g, i, j, k, l, n, or o, may be the primary lesson frame. It is entirely at the discretion of the programmer as to how the lessons are arranged on the film, and the arrangement illustrated in FIGURE 4 is merely illustrative for the purpose of demonstrating the progression of the student from a frame of one type of information to the frame of another type of information, and vice versa. A study of the figure makes it evident how the instant invention controls the presentation of frames in terms of the manner in which they have been programmed and how the student responds.

It should be evident that this system offers no limitations on where a program writer may decide to take the student for the next presentation after a selection has been made. Notice, for example, that at frame o the programmer wants the student to return to frame a. As long as the identity code of frame a is distinctive from the identity codes of all other frames between frame o and frame a, the film will continue to traverse and stop only when frame a is reached.

Figure 6:
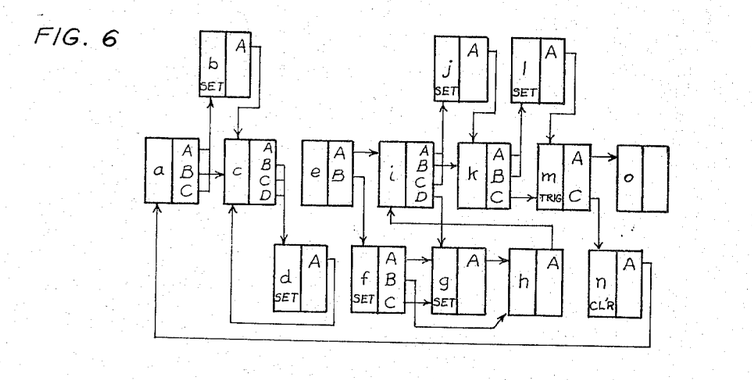
FIGURE 6 is a map which typically shows how a series of lessons in a program may be directed and controlled by the means in FIGURE 5.

Referring now to FIGURE 6, some type of arrangement of frames is shown where the memory-override device is used, this arrangement of frames being merely exemplary and employ to clarify the function and operation of the device. Assume that all of the in-line frames a, c, e, i, k, m and o are informative and advancing, and that all other frames are basically corrective in nature. The progression through the informative frames if all correct answers are selected to the questions on these frames, or the advancement to the corrective frames in the event that incorrect answers are selected, follows the same sequence of events as that outlined above in connection with FIGURE 4. However, it will be noted that all of the corrective frames have a cocking code on the code portion 20 of the film, except the frame n which has a clearing code; also, it should be noted that informative frame m has a triggering code.

In the selection of answers through the progression of the information frames a through m, an incorrect answer causes a corrective frame to be presented which in turn causes the cocking code to be sensed by the appropriate sensing element 24 of the readout matrix so that the flip-flop 25 is cocked. When the frame m is eventually presented, the trigger code is sensed and a trigger signal is sent to the AND gate 26. Since the flip-flop has been cocked by an incorrect answer somewhere in the past group of frames, this trigger signal and the cocked flip-flop will cause an output from the AND gate and the identity core in the C location of frame m will be read out by appropriate sensing element of the matrix 15. Frame n is then automatically presented, and in practice this happens so fast that the student is unaware that frame m has been presented, even momentarily. That is, the change from frame k or frame l, whichever is the preceding frame relative to frame m, takes place so fast that from frame k or frame l the next frame that the student actually sees is frame n.

If, on the other hand, the student has made no mistakes in the progression of lesson frame a through frame m, then no corrective frame has been presented and the flip-flop has not received a cocking signal, so that when frame m is presented and the trigger code is sensed, there will be no output from the AND gate since the trigger circuit alone is not capable of producing a signal from the AND gate. Thus, frame m will remain presented to the student. It is thus apparent that in order for the student to remain at frame *m* and have the opportunity of progressing to frame *o*, he must master the entire series of lessons, that is, make no erroneous selections in frames *a*, *c*, *e*, *i*, and *k*.

It will also be noted that in the event of a wrong selection and the presentation of a corrective frame with a cocking code, the presentation of frame *n*, which contains a clearing code, uncocks or clears the flip-flop so that it is no longer responsive to cause an output from the AND gate unless it is again cocked as the result of an incorrect answer in the second progression through the informative frames.

Figure 8:
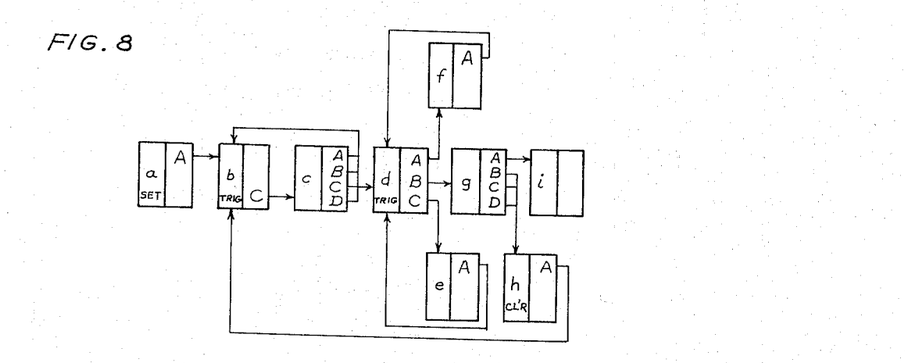
FIGURE 8 is a map which typically shows how a series of lessons in a program may be directed and controlled by the means in FIGURE 7.
Figure 9:
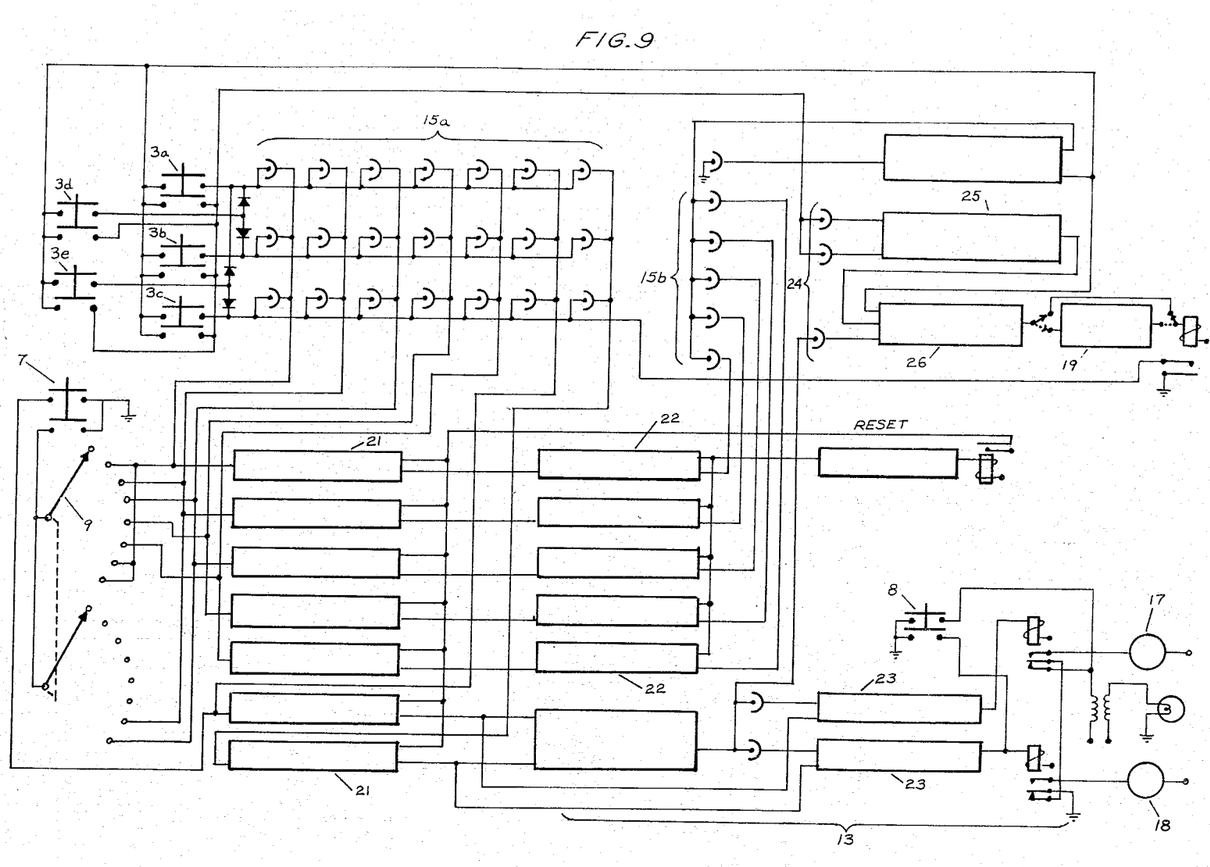
FIGURE 9 is a simplified logic-circuit diagram of the entire system.

Referring now to FIGURE 8, there is presented a portion of a lesson sequence similar to that shown and described above in connection with FIGURE 6, except that the portion of the series commences with a frame of corrective information containing a cocking code. This illustration is for the purpose of clarifying the function of the time delay device in conjunction with the memory-override device. When frame *b* is reached, the trigger signal is sent and frame *b* is presented to the student only for the period of time set in the time delay device. When this period ends, the identity located at C is automatically read out and the film is moved until frame *c* is reached. At frame *c* there is no code to cause a triggering signal, and therefore the student can view the frame as long as he desires. At frame *d* the presence of the trigger code causes this frame to be presented on the screen for whatever time has been set on the time delay device. Notice that with frame *d* the student is obviously being given a question and must make his choice before the time delay expires; with frame *b*, on the other hand, the information was purely informative without any testing being involved. But with frame *d*, when the student fails to make a choice of answer within the time period, frame *e* is automatically presented. If an incorrect response (selection A in this instance) is selected, then corrective frame *f* is presented. A correct response, made before the time expires, causes frame *g* to be presented. If the student arrives at frame *h*, there is a clear code which signals and clears the flip-flop 25, so that the flip-flop is restored and gives no output. Consequently, when the student goes back to frame *b* from frame *h*, there is no time delay at frame *b* or at frame *d* since there is no output from the AND gate. Thus the student can study frame *b* and frame *d* at his own pace. FIGURE 9 shows a schematic diagram of this invention. Items 21, the registers, are shown only as blocks since these are common flip-flop type driver logic circuits and may be any of numerous configurations. Likewise, items 22, comparators, are only blocked out because these are exclusive—or circuits. Since the main components of the circuit bear designators corresponding to the parts mentioned in the foregoing description, their function is readily understood by reading the description but following FIGURE 9. For example, assuming a frame is at location for presentation and read by the student, making his choice he presses one of the buttons 3*a* through 3*e* which activates one or more of the rows of photocells in the array designated 15*a*. The individual cells of the row, or rows, which is activated now become capable of conducting if transparent code holes are present on the film. Whatever code is present, therefore, causes certain of the registers 21 to be set, including one which directs the film to be driven in a forward or reverse direction. As the film moves, a set of coding on each frame activates the photoelectric cells in the array designated 15*b*. The signal patterns from this readout are compared with the signals stored in the registers by means of the comparators 22. When the frame is reached which has a set of codes which match those placed into the registers, the match is detected and a reset signal de-energizes the drive system, and the film is aligned by the system designated as 13 for presentation of the frame to the student.

Certain frames will have a transparent code detectable by one of the photoelectric cells in the array marked 24. This cell sets register 25, a circuit like 21. At some other frame, a transparent hole in another location will cause another of the photoelectric cells of array 24 to send a signal direct to AND gate 26. If the register 25 is also set, AND gate 26 sends an output to the time delay mechanism 19. After whatever time is delayed by the time delay mechanism, the signal then turns on a relay which sends a signal to activate the array in 15*a*. This causes a certain row of the array to respond just as if it had been activated by the student depressing one of the 3*a* through 3*e* pushbuttons. In other words, the circuit consisting of elements 24, 25, 26, and 19 serves as an automatic means to cause activation of the code readout and drive system, and can do it with respect to a delay in time. This whole system can be automatically deactivated by still another photoelectric cell of array 24 which resets the register 25 upon becoming conductive through the presence of a specific code hole at a frame.

While a specific embodiment of the device of this invention has been described, this is done solely for purposes of simplicity of description. It will be obvious to those skilled in the art that several more than five push buttons could be made available for use, and that the output of the memory-override device could go to any readout code location or to a separate location set aside for this function. Furthermore, one need not be restricted to a single cocking or set code but there might be several flip-flops of the nature of the flip-flop 25 serving AND gate 26. In this case the programmer could arrange lessons which "see" what the student does over several frames before the AND gate output can be activated. Furthermore, the code which sets the flip-flop 25 could be associated with the identity codes selected by activating the switches A, B or C. In this case, for example, a wrong answer would immediately set flip-flop 25 instead of having this occur at the subsequent frame. It is also evident that a timer, either reset by hand or by any appropriate signal such as the reset signal from the comparator to the register, could be used to activate the readout of an identity code after some prescribed time. However, such would not have the automated flexibility apparent in using the means herein described.

The foregoing description and accompanying drawings are not to be considered as limitations upon the invention which is susceptible of obvious modifications, improvements and additions in the electrical circuits and relay connections without departing from the spirit or scope of the invention. It is intended, therefore, that the instant invention be limited only to the scope set forth in the following claims:

What is claimed is:

1. A teaching device for visually projecting a logical sequence of individual frames of a self-contained film lesson series and individual lesson frames, comprising a film, a series of frames on said film, each frame containing a coded address and having at least one code identity corresponding to coded addresses on other frames in the film, mechanical means to indicate a response to a visual stimulus from a first frame, electrical means actuated by said mechanical means thereby producing a first signal from a coded address on said first frame, and a second signal which corresponds to the coded address of another frame to be positioned to be projected and viewed, driving means to move said series of frames past the position where a frame can be projected and viewed, a register comparator device to start said driving means upon receiving said first signal from a coded address on said first frame and stop said driving means upon receipt of said second signal through a second frame having a coded address which matches said first signal produced at first frame; further including a memory-override device comprising another electrical means responsive to another code identity on a selected plurality of said frames having either said single predetermined code identity, or said plurality of code identities for initiating a signal, means for registering and retaining said signal, a third electrical means responsive to a third code identity on a selected one of said frames following said plurality of frames, means for combining said third signal and said registered signal to initiate a fourth signal which actuates said first mentioned electrical means to sense a code identity on the frame having the code identity which matches that of said first signal to initiate a fifth signal which overrides the first of all said signals whereby said frame having the code identity which matches that of said first signal is only momentarily in a projectable position, and a subsequent frame with coding matching that of said fifth signal is projected for extended visual observation.

2. A teaching machine as set forth in claim 1 further including means in said memory-override device for clearing said registered signal in response to a signal received from a fourth code identity on the frame following the momentarily projected frame.

3. A teaching machine as set forth in claim 1 further including means for delaying the transmission of said fourth signal to said electrical means whereby the period of projection of said frame having the code identity which matches that of said first signal may be extended.

4. A teaching machine as set forth in claim 3 wherein said means for delaying the transmission of said fourth signal comprises a time delay circuit interposed in series circuit with the output of said means for combining said third and said registered signals.

5. A teaching machine as set forth in claim 4 wherein said time delay circuit is manually settable to vary said period of projection.

6. A teaching machine as set forth in claim 4 wherein said time delay circuit is automatically settable in response to a signal from still another electrical means from a fifth code identity on said frame having the code identity which matches said first signal.

References Cited

UNITED STATES PATENTS

| | | | |
|---|---|---|---|
| 2,783,454 | 2/1957 | North | 35—9 X |
| 3,187,442 | 6/1965 | Hertsche | 35—9 |
| 3,191,315 | 6/1965 | Hannah | 35—9 |
| 3,292,276 | 12/1966 | Hansel | 35—9 |

FOREIGN PATENTS 1,006,161  9/1965  England.

EUGENE R. CAPOZIO, *Primary Examiner.*

R. W. WEIG, *Assistant Examiner.*